Patented Apr. 27, 1943

2,317,397

UNITED STATES PATENT OFFICE 2,317,397

PROCESS OF CONDITIONING FOODS

Harry A. Noyes, Newton, Mass.

No Drawing. Application February 10, 1938,
Serial No. 189,760

8 Claims. (Cl. 99—192)

This invention relates to processes for conditioning food products and relates particularly to processes for enhancing the flavor and appearance of food stuffs, such as, for example, flesh foods, fruits and vegetables through testing while in the frozen state.

Of fundamental importance in the conditioning and preservation of foods in their natural state is the fact that all food stuffs contain soluble materials which may be lost or altered by contact with solutions of many types. For example, if meats, fruits or vegetables are placed in water, the water has a tendency to dissolve out the soluble components of these articles, thereby altering their appearance and flavor. If such products are placed, for example, in solutions of salt and/or sugar, there is a migration of both the substances in the solution and in the food product which tends to equalize the concentrations of the various soluble constitutents. The movement of water out of the foodstuff is often rapid. This migration is altered or controlled by reactions which take place in the food product and because of varying conditions in the food product, the migration is not uniform. Therefore, different portions of the food products will be varied as to appearance and flavor depending upon the permeation of the food product by the constituents of the solution and by the loss of various constituents and part of the water which are normally present in the food product itself. For example, if berries are placed in a sugar solution, there is a rapid withdrawal of water of soluble phosphates, sugars, acids and other constituents from the berries. At the same time there is a migration of the dissolved sugar into the berries. If this movement of constituents is allowed to continue over a long period of time, or if hastened as by heating, the final result is a mass of berries in a syrup, all of which have about the same flavor. That is, the berries have lost to the syrup a large part of their flavor and water while they have been sweetened by the syrup.

From the above discussion, it will be seen that the treatment of food stuffs in their fresh, natural condition, with soluble substances, solutions, heating, or drying, irreparably alters the condition of the foods and thereby destroys, at least in part, their natural characteristics.

While natural foods of many types cannot be improved by any heretofore known method, it would be highly desirable to make changes in them, such as for example sweetening, distributing the flavor and color, or even adding ingredients which would preserve, improve and/or distribute the flavoring and/or coloring without removing or decreasing the quantity of constituents which are normally present in the foods.

Another object is to take advantage of the state of freezing and/or solidification produced by freezing methods as a means of utilizing substances in solution for dissolving and distributing constituents that are present or added.

Another object is to take advantage of the condition of the foodstuffs while being stored in the frozen or solidified form, at temperatures low enough to prevent deterioration but which are above the solidifying points (eutectic points) of constituents contained or added, for the purpose of conditioning the product by means of added materials or the distribution of constituents present therein.

Still another object is to add to the soluble solids content of frozen or solidified objects without concurrent extraction of any constituents and to progressively diminish the solidified or frozen state with the increase in soluble solids content until a concentration of soluble solids results that is sufficient to keep the object from spoiling or deteriorating at ordinary room temperatures.

Other objects will become apparent as typical embodiments of the invention are described hereinafter.

Before changes can be made to take place in the foods, without depreciation, or impairment of the natural qualities or characteristics of the foods, it is necessary to place the foods in a comparatively stabilized or inert condition. As set forth above, if foods are in their natural warm or unchilled condition, treatment with solutions or soluble solids causes the migration of soluble constituents and water outwardly from the foods and the migration or permeation of the treating material into the foods. Heating increases the rate of migration and in addition tends to alter the natural characteristics of the foods. Cooling, on the contrary, decreases the rate of migration or activity and if carried to such temperature that the foods and treating materials are frozen or solidified, effectively prevents any rapid interaction or change.

It has been discovered, however, that by freezing or otherwise rendering the food stuffs inert, and applying a solution of desired material and concentration to the food, progressive penetration of the applied material into the food can take place. The solvent or treating material during its penetration into the foodstuffs dissolves constituents of the food and carries or distributes them gradually throughout the food. At the same time, the inert condition prevents proportional migration of the normally present materials outwardly from the food. With some foods the solubility of the natural colors and flavors with their subsequent distribution throughout the foodstuff increases the color and flavor of the whole foodstuff, while with others the distribution is not as desirable because only certain portions of the foodstuff are to be utilized as food. Redistribution, reconcentration and even a desired concentration of color and flavor may be accomplished by a particular technique used to dissipate the solidified or frozen state. Controlled defrosting rates for portions of the foodstuff as different from the entire foodstuff, or even the addition of concentrated or solid compatible material to a predetermined portion of the surface of the foodstuff can cause a desired movement of soluble constituents. For example, after a foodstuff is frozen, a concentration of the flavor and color occurs at the surface when that portion is defrosted much more quickly than underlying portions.

As previously indicated, the most satisfactory method of rendering food comparatively inert and therefore in the proper state for conditioning is by solidifying through the rapid reduction of temperature, for instance, as by freezing. The freezing action preferably should be such as to prevent physical or chemical changes in the foods. For this reason "quick freezing" is a most suitable method for refrigerating the foods. Quick freezing as understood in the trade consists of subjecting the foods under suitable conditions to such low temperatures that the food passes through the temperature zone of maximum crystal size formation too rapidly to allow the formation of large crystals. By avoiding the formation of large crystals of ice, or other materials in the foodstuffs, rupturing of the cells of the food and loss of the liquid content of the cell is greatly decreased.

Many different types of quick freezing processes are known. One process consists of placing the foodstuffs in liquid-tight containers, or between conductive plates and directing a shower of refrigerated liquid against the plates or containers to rapidly freeze the food products therebetween or therein.

Another method consists of directly contacting the foodstuffs with a flowing current of refrigerated air. The air freezing method has the disadvantage that it causes a surface dehydration of the foodstuffs and thereby causes them to depart slightly from their fresh natural condition.

Another method consists of subjecting the foodstuffs directly to contact with a flowing or sprayed refrigerated liquid. Because of the intimate contact between the refrigerated liquid of proper properties and the food product, extreme rapidity of freezing is obtained and crushing or mutilation of the products is avoided. A proper freezing solution can be used at a low enough temperature and applied with enough rapidity so that there is formed almost, if not immediately, an entire solidified surface of the foodstuff before any osmotic action has a chance to set in.

Any of the above described quick freezing processes or combination of the same may be applied to the foodstuffs to render them practically inert. When the food products are in a frozen condition, and stored at a low enough temperature there is very, very slow migration of the water soluble components or constituents of the food products under ordinary circumstances, since they are in a substantially solid state. If, however, a solution of a solid or solids in water, such as for example solutions of invert sugar, high levulose or levulose are placed on the surface of the foodstuff and the solution is not frozen but at the temperature of the foodstuff, it starts to migrate into or permeate the outer surfaces of the food product then layer after layer. As the treating material penetrates into the food product it causes a lowering of the freezing point in that zone of the foodstuffs, thereby acting in effect to dissolve the soluble constituents of the food products in those zones. The action of the treating material continues progressively into the foodstuff and at the same time acts to dilute itself and to carry dissolved portions of constituents of the foodstuffs progressively toward points of lower concentration. The continued movement of the treating material finally results in a uniform distribution of this material throughout the foodstuffs, and likewise a uniform distribution of the various constituents, such as coloring matter and flavor throughout the entire foodstuff. Penetration or permeation of the food by the treating material, applied in small amounts as surface films, by spraying, by dipping or by immersion of the frozen foodstuffs for not too long periods, may be carried forward in successive steps to produce an extremely high concentration of the treating material in the food. Thus by applying solutions of increasing concentration successively and at intervals, extending over periods as long as, even months, often with humidity control, to a food product at proper temperatures, the concentration of treating material in the product may become so great that the foodstuff is materially altered and becomes a new product. Thus, in accordance with this invention, it is possible by the successive use of sugar solutions, such as high levulose sugar, levulose or invert sugar solutions, to produce candied products without the application of heat and without the loss of flavor or other soluble components from the food. Sucrose solutions may be advantageously used in certain stages of the candying process. Another advantage of the cold candying process is that more mature fruits may be used because cold treatment does not cause disintegration of the fruit. The usual hot candying procedure tends to disrupt the fruit and therefore the fruit must be firmer and usually only partially ripened to withstand the candying process.

The temperature to which the articles are subjected at any stage of the conditioning treatment must be controlled so that treating material is in solution. As the amount of soluble material in the foodstuff rises by the treatment, there results an increased firmness, and, since the temperature control sets the solubilities and rate of penetration of such substances in solution, it is possible to prevent or to allow water (the compound $H_2O$) to go in or out of the product, as desired. The present process, however, may use movement of water both ways but the process is not primarily one of concentration of foodstuffs by withdrawing water from them.

The rate of adding constituents is very slow and often has to be held down to almost no rate to get the results desired. The invention might be said to be utilizing "solubility product" phenomena, change of state, jellations, heats of solution, heats of dilution etc. while holding the structure of the foodstuffs. Physical changes accompanying increase in concentration of soluble solids content of the foodstuffs take place slowly. The actions may be thought of in connection with the well known experiment where a weight, suspended below a cake of ice by a wire passed over the cake of ice, is lowered by virtue of the wire passing through the ice without leaving a cut in the ice.

If an air blast tunnel is used for freezing the strawberries the berries may be treated as hereinafter described. If the berries are frozen with brine the surface film of brine freezing solution which is normally retained may be removed by centrifuging. An invert sugar solution, such as is commercially available, or levulose or high levulose solution is then poured over the berries to form a surface film on each of the berries. The berries with their surface film are thereafter conveniently stored in a desired frozen state for a suitable period of time. As time goes on the surface film of levulose or invert sugar will disappear and no drainage of the material will be found, thus showing that the material has soaked into or permeated the berries. The surface of the berries, however, will be such that they can be bitten into and the flavor recognized when below defrosting temperatures.

Upon thawing, the berries are of a uniform red color throughout instead of whitish in the center and red adjacent the surface and have a slightly sweetened flavor. In fact a greater amount of sugar could be added to the berries, as is customary with normal fresh berries.

An example which shows the difference between foodstuffs, especially berries that have been conditioned according to the principles of this invention, and those which have not been, is strawberries frozen by sugar carrying contact freezing solutions. One lot was immediately centrifuged while maintained at about 22° F. in order to separate as much of the sugar remaining on the surface as feasible while the other was allowed to drain for about one hour in a refrigerated room held at the same temperature. The berries were packed in standard enamel-lined tin cans (20 lbs. to a can) and stored in a room at 0° F. for approximately five months when the following comparisons resulted.

A shortcake was prepared by identical procedures and formulas from berries of each lot. Those berries which had been centrifuged after freezing gave a very liquid, off-colored, crushed strawberry covering with a watery, cooked taste that could be surpassed by using carefully prepared low sugar strawberry preserves. Those berries that were allowed to retain the sugar coating during the period of storage had higher and distributed color, more flavor and produced a shortcake adjudged similar to that from fresh berries.

Another test was the filling of quart paper cartons with each of the two lots of berries and then allowing them to defrost in an ordinary icebox. Over twice as much liquid separated from the centrifuged berries as did from those which had been conditioned by the sugar syrup remaining on the surface after freezing and draining.

Still another test was the placing of berries from each treatment in comparable portions of the defrosting pan of an electric refrigerator. They were allowed to defrost and compared forty-eight hours later. The conditioned berries were firm and had full color and flavor extending throughout the fruit. Those from which the freezing solution had been centrifuged still were colored only at the surface, were soggy and ate in a way that was typified by the expression "thin" and more watery than fresh fruit.

Another phase of this invention involves the treatment of food products which have been solidified, as by freezing. It has been found that the rate of defrosting of frozen food products is of substantially as great importance as the manner in which they are originally frozen. By way of example, it has been found that refrigerated solidified fish, meats, etc., have vastly superior qualities if they are thawed or returned to a temperature above their solidification temperature quite gradually. Even slow frozen products may be returned nearer to a satisfactory appearing and usable state, if they are thawed slowly over a period of twenty-four to forty-eight hours or longer, depending on size. In the conditioning by defrosting it is a requirement to have the products defrost without appreciable condensation of moisture on the surfaces and the heat is added at rates not over those at which its effects are distributed through the entire mass of the frozen product virtually uniformly.

Likewise, frozen and conditioned berries should be thawed gradually rather than abruptly when they are to be served as fresh, in order that they will be firm and full bodied. It has been found that abrupt thawing causes the berries to be somewhat soft and mushy and to leak liquid, apparently because of breakdown of the cell walls and the extraction of liquid by the higher temperatures along with condensed water at or near the defrosted portions, whereas if the berries are defrosted gradually, as by wrapping and placing in a refrigerator and allowed to thaw over a period of twenty-four hours, or more, they will have substantially the same texture and firmness as freshly picked berries. As indicated above, the thawed product has all the desirable characteristics of natural fresh berries, that is in so far as the normal constituents are concerned, has no added condensed water and, in addition, has improved coloring and enhanced flavoring throughout. Two distinctive types of the application of food conditioning by this invention are, for example, possible as illustrated by the following:

A portion of the flavor of such products as peaches is associated with the skin and with the pit or stone. Whole peaches, for example, are quick frozen. The solidified or frozen peaches are stored whole with a preferably levulose containing sugar solution on their surfaces and the sugar solution on the surface penetrates into the peaches while held frozen conditioning them and distributing the color, flavor, etc., which is lost by usual hot water or lye peeling procedures. The peach contains fruit sugar which extracts flavor from the stone or pit slowly as the storage period is increased. After the desired amount of conditioning has taken place the skin is removed by dipping the peaches in lukewarm water at about room temperature and stripping off the skin. The skinned fruit is immediately replaced in cold sugar solution carrying a little citric acid which may be conveniently maintained somewhere between 15 and 25° F. The stone or pit is then removed by breaking the peach open and knocking out the stone. This is possible for the conditioning has produced a firm but not ice-like structure. The halves are then returned to the cold sugar solution or sliced and returned to the sugar solution. The conditioning produces a firmness which increases yield and prevents losses which usually result from slicing or cutting operations.

Another example of conditioning, in accordance with this invention, consists of treating peas by freezing them in a shower of refrigerated liquid, for example, sugar and salt solution, to reduce the peas to a hard condition. The surface film of a refrigerant is not removed from the peas and they are stored, preferably in barrels in a refrigerating chamber, at a temperature of about plus 10° F. At this temperature the film of refrigerant gradually disappears by permeation into the peas and a highly desirable, slightly sweetish taste, which normally characterizes freshly picked and fully ripened peas is present after the frozen peas are thawed. The individual peas are firm, full bodied and of a highly desirable uniform natural color.

Barrels are given in the above illustration as the containers for the frozen product for two reasons—one there is need for bulk storage of products, and products that are conditioned can be handled in bulk more easily than loose products that change appearance etc. on the least dessication. Air frozen bulk stocks of vegetables, fruits etc. can be sprayed with the proper amounts of treating (conditioning) solution as they are packaged "out of the bulk" whereby they are unified in appearance, and improved in many ways.

The above examples showing conditioning of fruits and vegetables may well be supplemented by an example of the preservation of meats. In pickling, curing or preserving meats it is customary to apply solutions of sulphites and nitrites or other materials thereto which are gradually absorbed into the outer surface of the meats. In accordance with this invention the meats are first frozen in any desired way, preferably by contact with refrigerated liquid and a solution of the desirable treating salts or materials is applied to the outer surface. The frozen meats are then retained in a refrigerating chamber at comparatively low temperature but at not such a temperature that the treating material on the surface will freeze, and allowed to stand until the solution disappears and penetrates into the meat. The treating solution distributes itself throughout the meat thereby rendering its preservative effect uniform.

Fruits or vegetables may likewise be conditioned with extremely satisfactory results after freezing in a refrigerated spray which can also be used later to condition the frozen products, such as for example, a sugar containing solution of sugar-salt containing solution. The frozen products, after partial draining, are packed in containers the lids of which are fitted on the ends, but not hermetically sealed. The containers are then turned lid downwardly and placed in a room where the temperature is maintained at about 0° F. or below the freezing temperature of the refrigerant. The excess refrigerant collects in the bottom of the container before the temperature goes below the freezing point, then it freezes and forms a solid seal, which prevents circulation of air through the container and thus avoids dehydration of the food. When the containers are distributed as in cars or trucks, the containers are placed with their lids up. The cars and trucks are not maintained below the freezing temperature of the refrigerant and the latter melts, trickles down through the food and acts upon the food before its temperature can drop again below its melting point, thus extending the conditioning of the food before it reaches the consumer.

The processes that result from this invention are easily adapted to the controlled use of the frozen or solidified state as applied to the particular foodstuff, in relation to extending the use of varieties of one kind of foodstuff and in relation to soluble constituents and to the substances which are employed in the conditioning operations. It is also a part of the procedures of this invention to temporarily arrest conditioning operations or to time them as well as to have one product take a part in conditioning another. For example, if the storage temperature is held below the eutectic point for the conditioning agent, the effect is stopped. Two substances each having different eutectic points may or may not be affected the one by the other. Again stopping one by lowering below its eutectic point may produce or again prevent chemical activities. The frozen and/or solidified state in accordance with this combination thus gives a timing and control of many factors which has not been hithertofore possible. The exampes given are only a few out of many but serve to illustrate the broadness of the principles involved.

Many types of foods can be conditioned by my process, to improve and/or distribute their flavor, and compatible flavoring, preserving, or coloring materials may be added to the foods without destroying or altering the natural constituents of the food. Examples of compatible treating materials are sugars, flavoring or preservative salts, fruit or edible acids, natural or synthetic flavoring materials and edible coloring materials. Many other conditioning agents may be utilized in conditioning the foods, without departing from the invention. Therefore, the above examples should be considered as illustrative only and not as limiting the scope of the following claims.

I claim:

1. A method of flavoring frozen foodstuffs comprising applying a solution of compatible flavoring materials to the foodstuff at predetermined intervals to form successive films of the said material thereon, maintaining the temperature of the foodstuffs at a point below its freezing temperature and above the freezing temperature of the said film over a period of time sufficient to allow each successive film in turn to permeate the frozen foodstuff, effecting uniform distribution of flavoring materials throughout the foodstuff, a substantial concentration of flavoring material being attained therein with no loss of natural flavors of the foodstuff.

2. In the treatment of frozen foodstuffs that naturally have different flavors and different concentrations of flavor in different locations within the foodstuff the steps of lowering the temperature of the frozen foodstuff below its freezing point, storing indefinitely in "frozen" storage, then defrosting slowly in the presence of added soluble substances placed on those surfaces where it is desired to concentrate flavors whereby flavors are concentrated at those surfaces.

3. In the treatment of frozen foodstuffs where it is customary to eat a portion, because the tastes and flavors of the natural product are more concentrated there, the steps of bringing the foodstuff to a temperature more than ten degrees below its freezing point and then having the application of heat to defrost said foodstuff applied in greater quantity on the surface of the portion customarily eaten.

4. In the treatment of frozen foodstuffs the steps of concentrating the flavors and tastes at selected locations of the foodstuff comprising lowering the temperature of the frozen foodstuff considerably below its freezing point, then defrosting in such a way that heat is added at the locations the concentration of flavors is desired and heat extracted at the surfaces farthest away from those to which the heat is added.

5. A process for the incorporation of added substances into frozen comestibles comprising treating units of frozen comestible with a solution carrying substances it is desired to incorporate into said comestible at temperatures below the freezing point of the comestible by covering the surface of the comestible with the solution and then storing the treated comestible at a temperature below the freezing point of the comestible but above the freezing point of the solution whereby substances are absorbed into the comestible.

6. A process for the incorporation of added substances into frozen comestibles comprising treating units of frozen comestible with solutions carrying substances it is desired to incorporate into said comestible by covering the surface of the comestible with the solution and then storing the treated comestible at a temperature below the freezing point of the comestible and then at other temperatures also below the freezing point of the comestible but above the freezing point of the solution whereby the desired substances are absorbed into the comestible.

7. A process for the incorporation of added substances into frozen comestibles comprising treating frozen substances with solutions of substances it is desired to incorporate by covering the surface of units of the comestible with solution, then storing at temperatures intermediate between the freezing point of the comestible and the solution used whereby the substances are taken up by the comestible and then repeating with solutions of different strengths.

8. A process for the incorporation of added substances into frozen foodstuffs comprising treating the frozen foodstuff with solutions of substances it is desired to incorporate in the foodstuff by covering the surface of units of the comestible with solution, storing at temperatures intermediate between the freezing point of the comestible and the solution used whereby the substances are taken up by the comestible and then treating with another solution and at temperatures whereby further substances will be taken up by the comestible.

HARRY A. NOYES.